(12) United States Patent
Schwarze et al.

(10) Patent No.: US 8,439,302 B2
(45) Date of Patent: May 14, 2013

(54) AIRCRAFT WITH AT LEAST TWO RUDDER UNITS IN A NON CENTRAL ARRANGEMENT

(75) Inventors: Malte Schwarze, Hamm (DE); Andreas Westenberger, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 315 days.

(21) Appl. No.: 12/913,466

(22) Filed: Oct. 27, 2010

(65) Prior Publication Data

US 2011/0095128 A1    Apr. 28, 2011

Related U.S. Application Data

(60) Provisional application No. 61/255,398, filed on Oct. 27, 2009.

(30) Foreign Application Priority Data

Oct. 27, 2009   (DE) .......................... 10 2009 050 747

(51) Int. Cl.
*B64C 9/00*     (2006.01)

(52) U.S. Cl.
USPC ................................................ 244/87; 244/91

(58) Field of Classification Search ............... 244/87–91
See application file for complete search history.

(56) References Cited

U.S. PATENT DOCUMENTS

2007/0176047 A1*   8/2007   Moore et al. ..................... 244/54

OTHER PUBLICATIONS

"Plane and Aircraft Aerodynmaics I" Lecture Script. Institute of Aerodynamics and Gas Dynamics. Stuttgart University, Stuttgart, Germany. 2007.

* cited by examiner

*Primary Examiner* — Philip J Bonzell
*Assistant Examiner* — Nicholas McFall
(74) *Attorney, Agent, or Firm* — Ingrassia Fisher & Lorenz P.C.

(57) ABSTRACT

An aircraft has at least two rudder units in a non-central arrangement. The rudder units have a profile and are rigidly secured to the aircraft. The profile is adjusted in such a way as to yield an inflow at a positive geometric angle of incidence, so that the profile generates a lift force having a component pointing in the flight direction. This makes it possible to offset a portion of the aircraft drag.

16 Claims, 6 Drawing Sheets

AIRCRAFT WITH AT LEAST TWO RUDDER UNITS IN A NON CENTRAL ARRANGEMENT

CROSS-REFERENCE TO RELATED APPLICATIONS

This application claims the benefit of the filing date of and priority to German Patent Application No. 10 2009 050 747.7 filed Oct. 27, 2009 and of U.S. Provisional Patent Application No. 61/255,398 filed Oct. 27, 2009, which applications are incorporated herein by reference in their entirety.

TECHNICAL FIELD

The technical field relates to an aircraft with at least two rudder units that are not centrally arranged, as well as to the use of a rudder unit that is not centrally arranged.

BACKGROUND

The aerodynamic airflow around a wing with a finite wingspan results in the formation of a three-dimensional flow pattern, in which streamlines are diverted in the direction of the fuselage, i.e., to the inside, on an upper side of the wing, and to the outside, toward the wing tip, on a lower side of the wing. The scope of this effect depends on how the circulation is distributed over the wingspan. In local wingspan sections, such a gradient in this circulatory distribution results in the formation of a so-called free vortex in the wake of the airfoil in the depth direction. In general, how the circulation is distributed over the wingspan is oriented to the optimum elliptical lift distribution leading to the lowest induced drag. As a consequence, the gradient of circulation over the wingspan increases toward the wing tips, with streamline diversion and free vortex formation being greatest there according to the lifting line theory, which in turn affect the flow pattern and provide a streamline diversion. However, the pressure compensation at the wing tips in the end causes the three-dimensional flow pattern to be most pronounced there, even given other types of circulation distribution.

In order to mitigate this effect and thereby reduce the induced drag of the aircraft, specially formed wing ends (also called "winglets") are arranged on the wing tips. The winglets essentially help reduce flow around the wing tips, and their suitable shape generates a thrust component.

In addition to relatively classic commercial aircraft with clearly separated fuselage and wings, there also exists the concept of a specific flying-wing aircraft, also referred to as "blended wing body", abbreviated BWB. A fuselage and wings there form a continuous and harmonious shape, which together generate the lift required for flight as a single unit. Detailed studies of different blended-wing body configurations for applies use as passenger aircraft have shown that, despite the disadvantages, additional bodies arranged in the airflow in the form of tail assemblies must be used to ensure rudder unit function. Without rudder units, there would be no adequate directional stability in flight, and in particular given the failure of an engine during takeoff.

Rudder units are required in aircraft with a blended-wing body configuration. It would here be possible to secure two rudder units to a central fuselage body in a non-central arrangement. On the other hand, it could also be possible integrate the rudder units into correspondingly dimensioned winglets. The rudder units are preferably arranged in mirror symmetry and spaced apart on an upper side of the aircraft.

Existing non-centrally arranged rudder units are given a neutral design in prior art. This means that, given the usual completely symmetrical profiling of the rudder units, all of their chords are tangential to the local inflow, and all local geometric angles of incidence on the rudder units equal zero. This yields exclusively one additional aerodynamic drag in the local profile plane and in the tail assembly, which increases the drag of the overall configuration and lowers the aerodynamic quality as reflected in the lift/drag ratio.

As a consequence, there may be a need for an aircraft or aircraft configuration with rudder units in a non-central arrangement, in which the aerodynamic quality and lift/drag ratio caused by the rudder units may be reduced to the lowest possible level. There may further be a need for modifying an already existing aircraft from prior art with rudder units in a non-central arrangement in such a way that their aerodynamic drag may be reduced without any greater outlay. In addition, other needs, desirable features, and characteristics will become apparent from the subsequent summary and detailed description, and the appended claims, taken in conjunction with the accompanying drawings and this background.

SUMMARY

According to an embodiment of the invention, the rudder units secured to the aircraft are configured, positioned and aligned in a non-central arrangement in such a way that, in addition to the actual control function to be initiated, they also generate a force acting in the direction of flight, which counters the drag of the aircraft, thereby at least partially compensating for the latter.

In the present document, the angle between a zero lift direction of a profile and the inflow is defined as the "geometric angle of incidence". In like manner, an inflow at a geometric angle of incidence measuring 0° means that very little or no lift is generated by the profile in this flow state. In this regard, FIG. 1 shows an overview of standard definitions for angles of incidence relative to a profile 1 with a chord 3, a zero lift direction 5, a local inflow direction 7 and an undisturbed inflow direction 9. The angle $\alpha_g$ between the undisturbed inflow direction 9 and the zero lift direction 5 here denotes the geometric angle of incidence.

However, let reference at this juncture initially be made to the mode of action for winglets, which have a similar effect on the overall drag of the aircraft, and whose mode of action better illustrates the core idea of the invention: As described above, winglets are secured to wing tips in an expansive three-dimensional flow field, where they may make use of the local inflow direction. In addition to the inflow in the x-direction, i.e., in the longitudinal direction of the aircraft, the latter also exhibits a y-component in the wingspan direction, which is oriented on the upper side of the wing from the outside in, and runs roughly from the wing tip in the direction of the aircraft fuselage. Paired with a separately adjusted profiling, correspondingly adjusting the winglet, in particular the angle of incidence, relative to this curved inflow makes it possible to aerodynamically configure the winglet in such a way as to generate a lift force on the winglet. A lift force produced by a profile is perpendicular to the inflow of the respective profile.

If an additional y-component flows toward the profile in a profile section, i.e., transverse to the longitudinal direction of the aircraft, a force component toward the front may be achieved. This inflow is present in the area of the winglet, meaning at the wing tips, so that a force component oriented toward the front in the direction of flight may come about given the right configuration. Since it is aligned opposite the drag, the latter causes the total drag formed for the aircraft configuration to diminish overall.

This low-drag configuration of the aircraft with winglets yields improved flight performance, i.e., a better climb rate, a greater climb angle and a higher range, and hence to effective operation, in particular with respect to fuel savings. Conventional practical experience has shown a fuel savings of up to 5% given overall improved flight performance and characteristics.

According to an embodiment of the invention, a forward force is generated by the rudder units of an aircraft that are not centrally arranged. The implementation of the invention is described in detail based on the configuration of a blended-wing body, even though it may also be applied to any other aircraft configurations that exhibit at least two rudder units in a non-central arrangement.

In a first embodiment of the present invention, the rudder units are configured and aligned in such a way as to be exposed to a flow having a laterally directed component relative to the profile section of the rudder unit, thereby generating a lift force on the respective rudder unit having a component running in the longitudinal direction of the aircraft, in this way countering the drag of the aircraft. Accordingly, the rudder units of the aircraft additionally achieve a thrust force that offsets a portion of the drag.

In addition to the thrust force of a rudder unit arising in the x-direction of the aircraft, there also exists a component that acts transverse to the direction of flight. However, given a paired, mirror symmetrical arrangement of two rudder unit surfaces in a non-central arrangement with the same flow conditions, such lateral forces would here offset each other precisely by achieving an equilibrium of forces.

One significant characteristic of the aircraft according to an embodiment of the invention lies in the fact that the characteristic inflow condition comprised of the x and y-component at the site where the respective rudder unit is integrated may be used for the advantage of the overall configuration due to the configuration of the rudder unit according to the invention. Contrary to prior art, the rudder units are here not given a neutral design, but purposefully exposed to a force that also has a component in the direction of flight, and diminishes the drag of the overall configuration.

This effect according to an embodiment of the invention may be generated at least by the three designs mentioned below. First, the lift force of the rudder unit in the profile section could be achieved with a suitable adjustment of the profile relative to the inflow. In addition, a specific profile curvature may be used to generate a lift component on the rudder unit that acts in the flight direction. However, the effective curvature in the profile section may also be increased by means of a rudder deflector arranged on the rudder unit. Finally, the lift force in the profile section of the rudder units may be achieved not just using one of these three options, but also through a suitable combination of the three options.

The common thread to the three options is the local angle of incidence relative to the inflow running toward the upper side of the aircraft. Accordingly, an embodiment of the invention provides for an aircraft equipped with at least two non-centrally arranged rudder units, so that an angle of incidence α that exceeds 0° is present at least regionally between the local inflow and zero inflow direction of a rudder unit section (the geometric angle of incidence, and the rudder unit surfaces are adjusted in such a way as to generate a force component directed in the direction of flight. This combination of features generates a lift force on the rudder unit having a component that acts in the longitudinal direction of the aircraft.

In an embodiment of the aircraft according to the invention, the profile of the rudder units at least regionally has a bend, thereby increasing the curvature of the profile relative to symmetrical profiles, and hence enabling the generation of thrust force according to the invention. Suitable to this end are thin profiles that generate a relatively low drag, but still may contribute to the thrust force of the aircraft. Since this profile depends on the velocity range of the aircraft in question, no definitive recommendation may be made at this juncture. The literature provides the person skilled in the art with suitable profile shapes to be selected for the corresponding cruising speeds, Reynols numbers and flying altitudes.

Another embodiment of the aircraft according to the invention provides a control unit configured to adjust at least one rudder on the at least two rudder units in such a way that the rudder may adopt a predetermined relative angle to the rudder unit. The control unit could further be set up to adjust the angle of the rudder as a function of the respective flight phase, speed and altitude in such a way as to yield a curvature of the rudder unit that produces a geometric angle of incidence to the locally present inflow according to the aforementioned features. The special advantage to the above is that no larger structural changes need to be introduced to benefit from the principles according to the invention, for example, in already existing aircraft. For example, if an already existing aircraft has two or more non-centrally arranged rudder units each equipped with a rudder, the respective profile of the corresponding rudder unit could be altered in such a way as to provide a local geometric angle of incidence to the present flow of the respective rudder unit per the aforementioned features according to the invention.

In another embodiment of the aircraft according to the invention, the rudder unit is designed in such a way that the local geometric angle of incidence decreases with increasing height of the rudder unit. This is particularly expedient, since the deflection of streamlines toward the middle of the aircraft tapers with increasing rudder unit height. For this reason, it makes sense to react to the above with a weakening profiling and/or diminishing geometric angle of incidence, thereby also reducing the profile drag of the rudder unit.

The generation of lift on the rudder units also increases the induced drag. As a result, the overall structural layout of the aircraft according to the invention must incorporate a suitable combination of adjustment, profile curvature, rudder deflection or other features, yielding a design in which the thrust component generated by the rudder units exceeds the additionally induced drag of the rudder units exposed to lift, thereby resulting in a drag advantage for the overall configuration.

When using rudders on the rudder units, the reaction to this aforementioned effect may come as soon as the rudder has at least two segments. For example, the rudder segments could be exposed to a lower level proceeding from the fuselage as the rudder unit height increases, so that the respective local geometric angle of incidence is at least incrementally adjusted to the local inflow at the respective location. The more rudder segments may be included, the better the adjustment to the local inflow situation may be.

In another embodiment of the aircraft according to the invention, precisely rudder units are present, arranged on the upper side of the aircraft in such a way that the chord and longitudinal axis of the aircraft include an angle exceeding 0°, and the edge of the rudder unit facing away from the flight direction is positioned more closely to the middle of the aircraft than the usually more strongly profiled edge of the rudder units aligned in the direction of flight, wherein this is also referred to in English by the term "toe out".

The need may further be met by using two or more non-centrally arranged rudder units to reduce the drag of an aircraft.

BRIEF DESCRIPTION OF THE DRAWINGS

Additional features, advantages and possible applications of the present invention may be gleaned from the following description of the exemplary embodiments and the figures. All described and/or graphically depicted features here constitute the subject matter of the invention whether taken alone or in any combination, even independently of their composition in the individual claims or back references thereto. In addition, the same reference numbers in the figures represent identical or similar objects.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
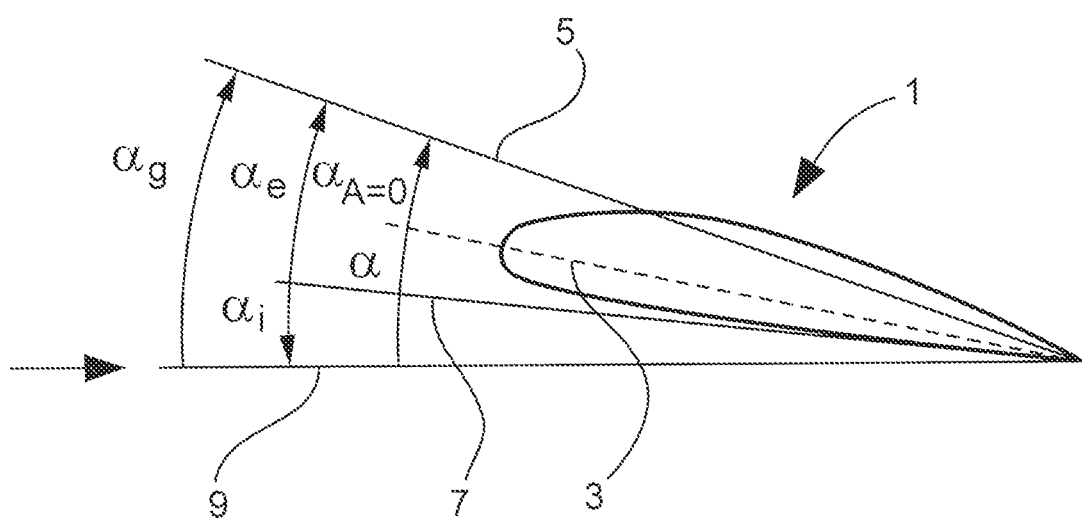
FIG. 1 presents an overview of common definitions for angles of incidence relative to a profile.
Figure 2A:
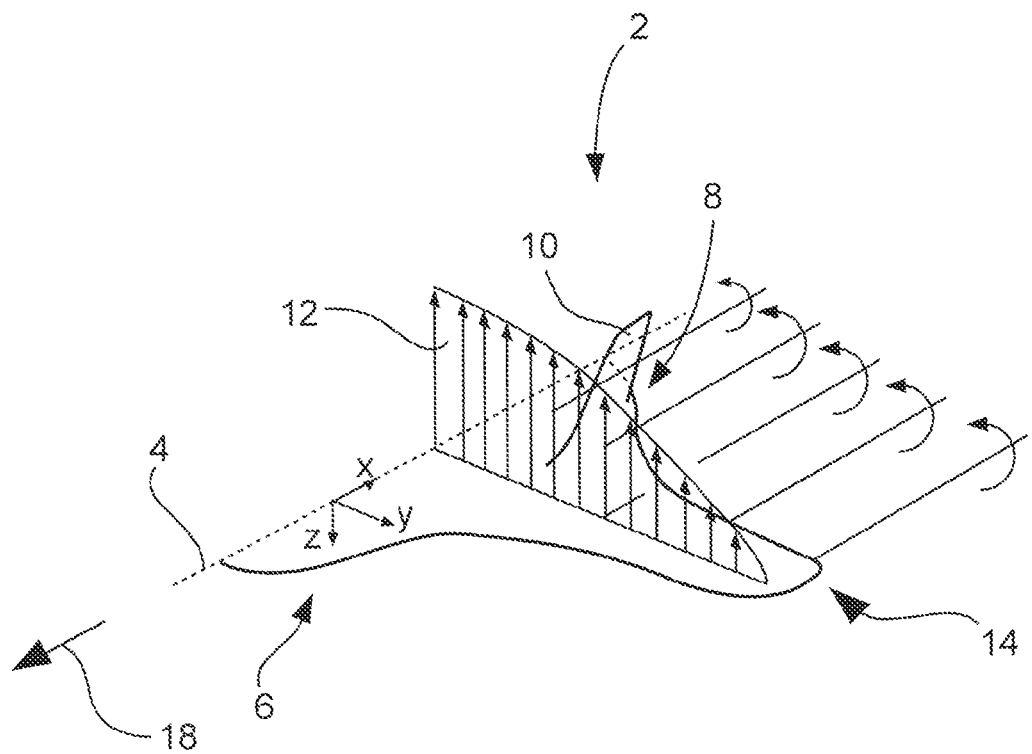
FIGS. 2a and 2b show how the 4 circulation is distributed over the wingspan for a flying-wing aircraft, as well as the resulting alignment of streamlines.

FIG. 2a shows half of an aircraft 2 with a flying-wing configuration, which has a longitudinal aircraft axis 4. The aircraft has a front side 6 and rear side 8. For example, the area of the rear side 8 is provided with a rudder unit 10, which is spaced apart from the longitudinal aircraft axis 4. As evident from the depiction, half of the aircraft 2 shown may be mirrored on the longitudinal aircraft axis to form a complete aircraft 2.

Arrows show a circulatory distribution 12 on the surface of the aircraft 2, wherein the circulatory distribution 12 has a gradient that peaks in the area of a wing tip 14. As a result of the depicted circulatory distribution 12, the airflow over the aircraft 2 does not travel along a straight line, but the streamlines 16 representing the airflow instead follow a curvature directed toward the longitudinal aircraft axis. The curvature here increases outwardly toward the wing tip 14. The effect is somewhat exaggerated on FIG. 2b to provide a better illustration.

Figure 3:
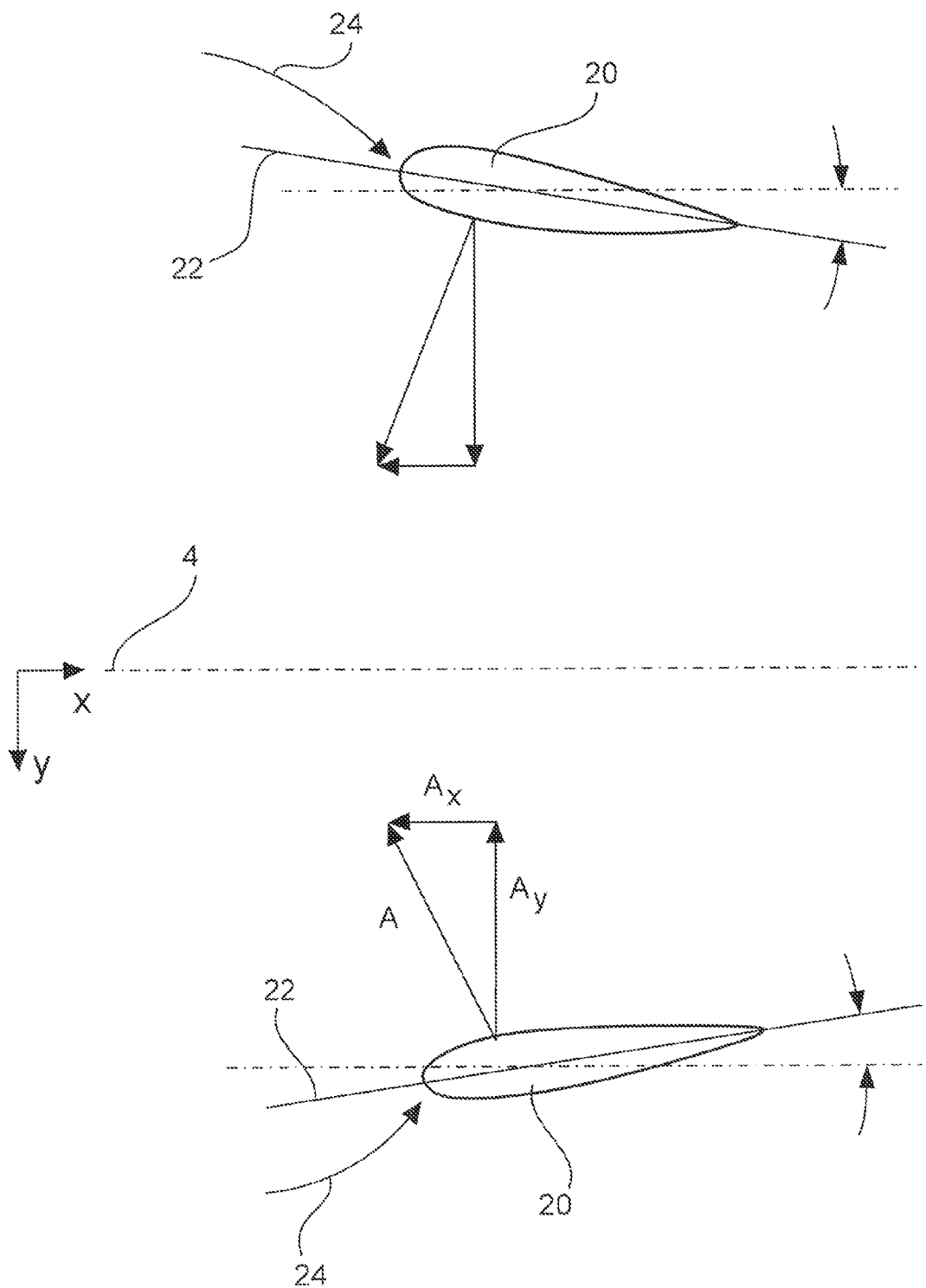
FIG. 3 shows an exemplary top view of the configuration and alignment of rudder units for an aircraft according to an embodiment of the invention.

The rudder units 10 are configured to generate a thrust force that exhibit a respective component in the flight direction 18, taking into account the curved progression of the streamlines 16. This could be realized by means of two rudder units 20 mirror symmetrically arranged and spaced apart on a longitudinal aircraft axis 4 on FIG. 3. For the sake of simplicity, only a profile section of the rudder units 20 is shown here. The chords 22 of the rudder units 20 are aligned in such a way that the locally present streamlines 24 hit the rudder units 20 so as to have the tangent of the streamlines 24 include an angle greater than 0 degrees relative to the chords 22. The non-symmetrical inflow yield lift forces on the rudder units 20 that run perpendicular to the chords 22. This is denoted by the arrow marked "A" on FIG. 3. This lift force may be divided into two components, specifically "$A_x$" and "$A_y$", where $A_x$ represents the component of thrust running parallel to the longitudinal aircraft axis 4, and $A_y$ represents the component of thrust A running perpendicular to the longitudinal aircraft axis 4. Given the suitable choice of angle for the chords 22 relative to the longitudinal aircraft axis 4, component Ax is oriented in the flight direction 18, thus meaning that part of the aircraft drag may be compensated in this way. It may be interpreted as a thrust force.

Figure 4A:
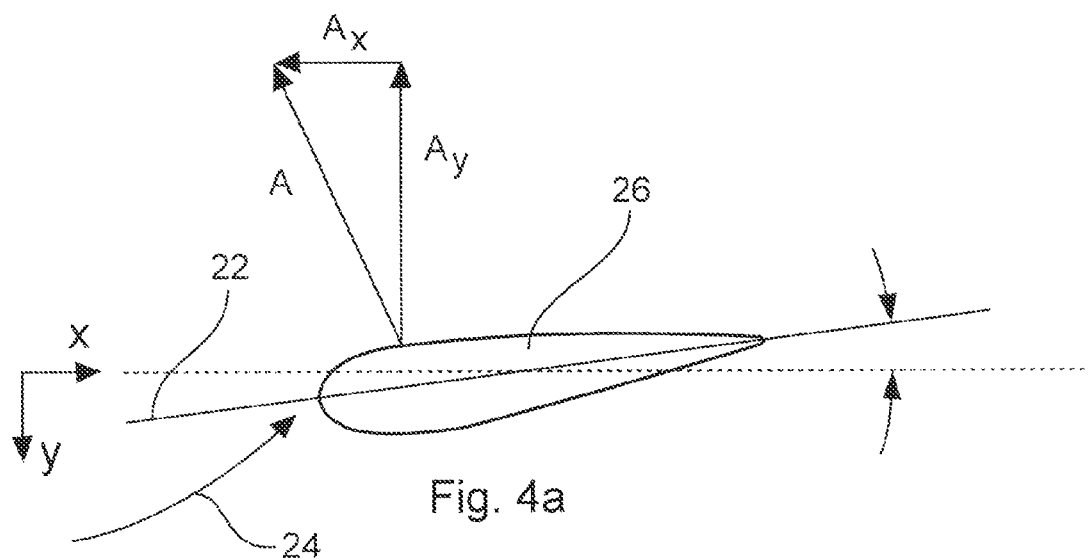
FIGS. 4a to 4c show different variants of a rudder unit for an aircraft according to embodiments of the invention.
Figure 4B:
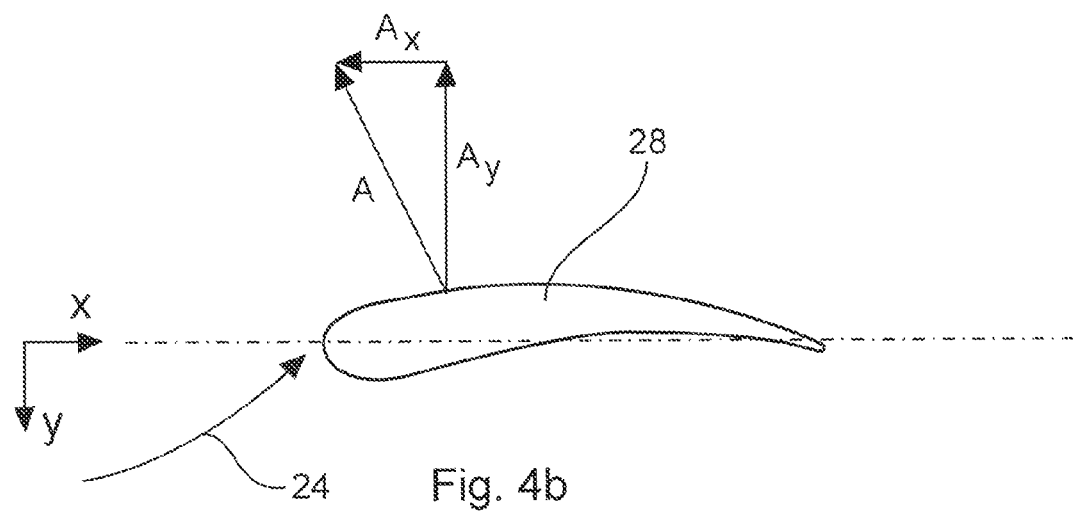
Figure 4C:
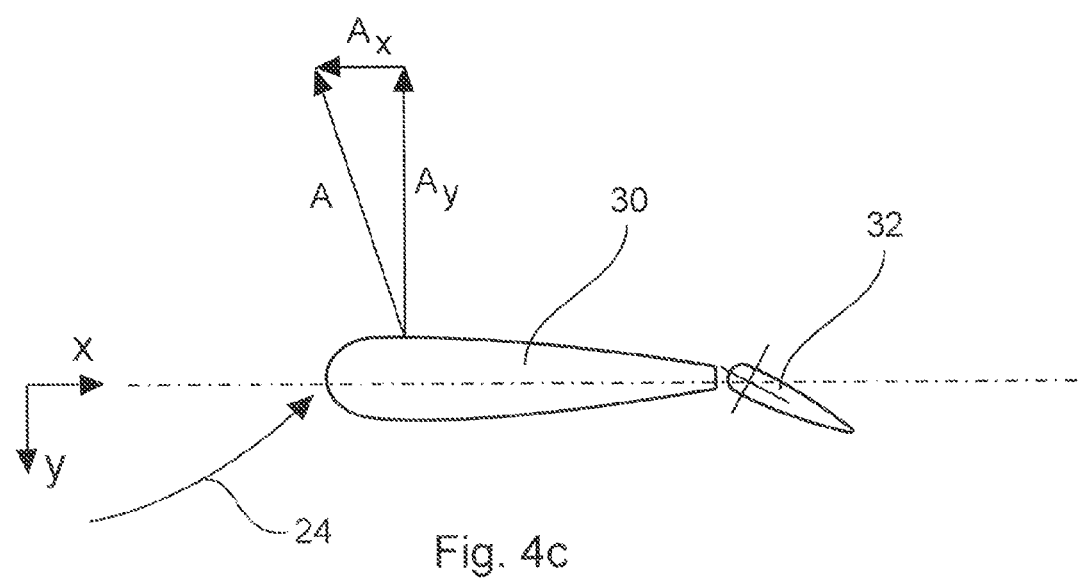

FIG. 4a to FIG. 4c show different configurations of rudder units 26, 28 and 30. FIG. 4a introduces the basic possibility of adjusting the angle between the chord 22 and longitudinal aircraft axis 4 to determine the strength and direction of lift for the rudder unit 26, and hence the thrust force $A_x$ acting in the flight direction.

In an aircraft according to an embodiment of the invention, it is also basically very easily possible to adjust the curvature of the profile of the rudder unit 28 for predetermined traveling speeds so as to initiate an optimal adjustment of the drag reduction. No limits are imposed on the person skilled in the art in terms of selecting the right profile for the rudder unit 28. Rather, there is an abundance of different profile cross sections in the literature, which may propose a series of profiles for whatever desired cruising speeds, Reynolds numbers and flying altitudes. All that must be done is to balance the expected flow drag of the rudder unit 28 against the potential thrust force $A_x$.

At the same time, there is also the possibility illustrated on FIG. 4c to configure a rudder unit 30 with a rudder 32 in such a way that adjusting the angle between the rudder 32 and chord 22 of the rudder unit 30 produces a curvature that may generate a lift force also having a component $A_x$ pointing in the flight direction. This is especially suitable for retrofitting already existing aircraft to reduce the overall drag of the aircraft. Modern high-performance military aircraft like the F-14, F-15 or F-18 have such a described, non-centrally arranged rudder unit configuration, wherein the F-15 even has segmented rudders already, along with a computer-assisted flight controller. It would be rather easy to provide a software retrofit of the features according to embodiments of the invention. Realizing the features of the embodiments of invention could be limited to the subsonic region, since this might yield a performance optimization, while the rudder segments may be moved in a neutral, zero-lift direction in the supersonic region, since a profile curvature inevitably leads to a higher drag there. The features of the embodiments of the invention could be adjusted to the flight phases accordingly.

The depictions on FIG. 4a to FIG. 4c each show only a single rudder unit 26 to 30, which is non-centrally arranged on the respective aircraft. However, this is not limited to these individual rudder units. Rather, the aircraft according to an embodiment of the invention in the simplest case has two rudder units 26 to 30, which are mirror symmetrically arranged relative to the longitudinal aircraft axis 4, so that the transverse forces $A_y$ may be offset.

In general, the solution from FIG. 4c allows for the possibility of updating the software of corresponding control unit connected with the rudders 32 to achieve a reduction in the overall drag of the aircraft using the core idea underlying the invention in an already existing aircraft with two rudder units and rudders 32 arranged thereupon as well as an electronic or computer-assisted flight controller. In this update, for example, a "neutral angle" would be determined by which both rudders 32 would have to be outwardly deflected to achieve an optimal reduction in the overall drag of the aircraft.

Figure 2B:
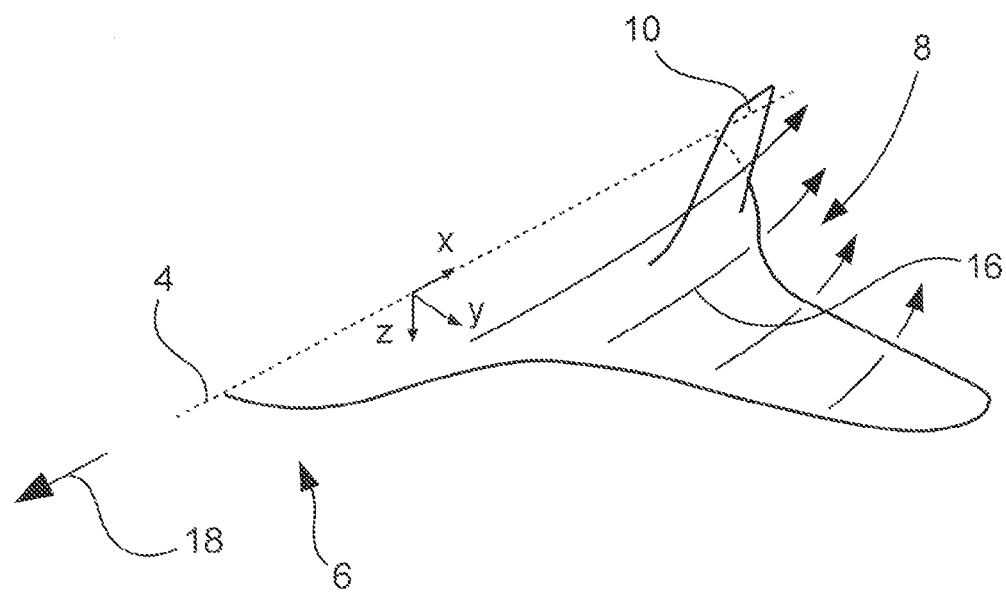
Figure 5:
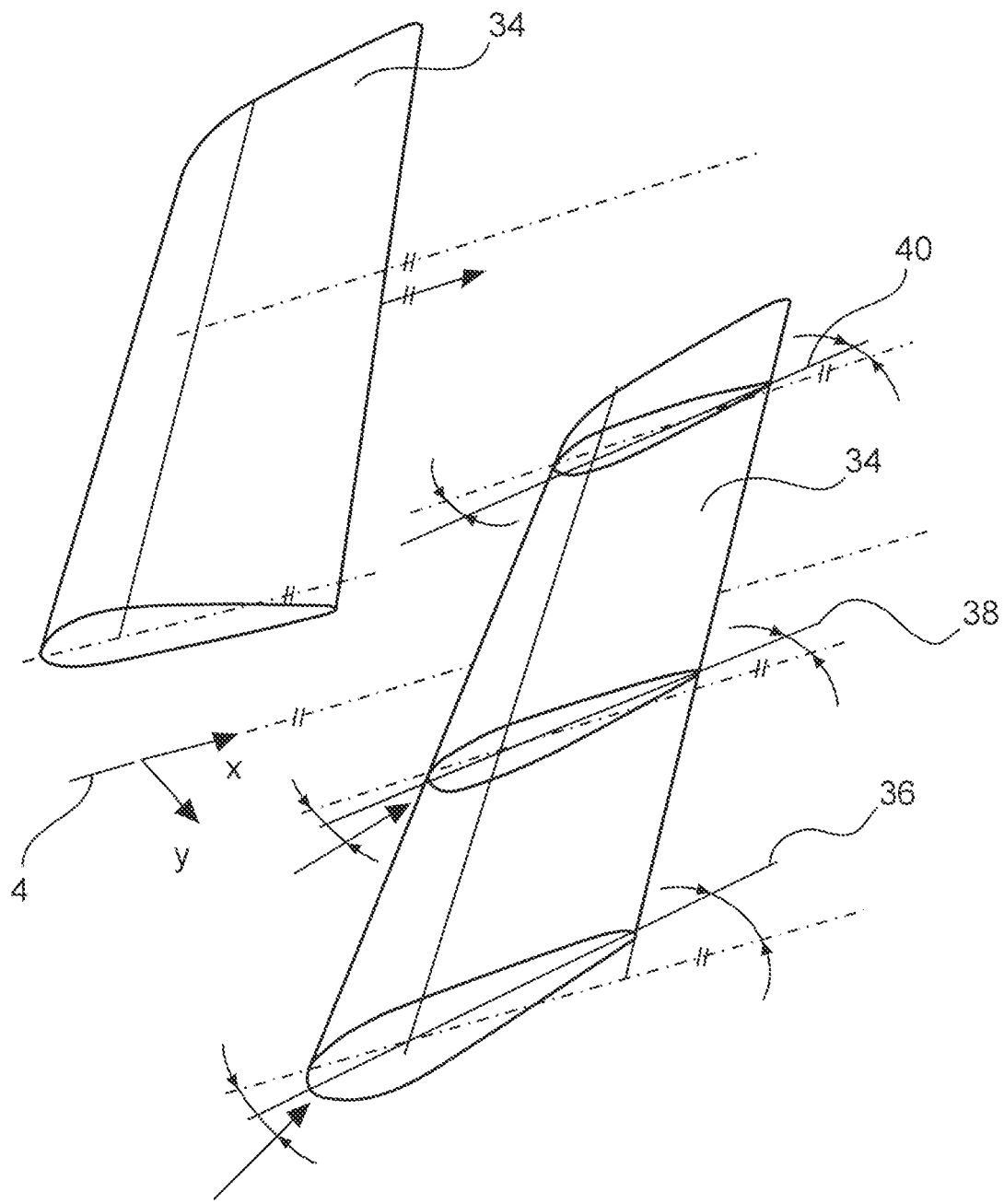
FIG. 5 shows two rudder units of an aircraft according to an embodiment of the invention with adjusted rudder unit geometry.

The curvature of streamlines 16 shown on FIG. 2b tapers continuously with the distance to the surface of the aircraft. As a consequence, a parallel, linear progression of streamlines 16 must be expected at a sufficient altitude over the aircraft. FIG. 5 depicts two modified rudder units 34, the chords 36, 38 and 40 of which adopt a smaller angle relative to the longitudinal aircraft axis 4 with an increasing distance from the aircraft surface. The number of chords 36 to 40 selected is only exemplary, and the person skilled in the art understands that the rudders 34 may be configured in such a way as to allow a continuous progression between a lowermost chord and uppermost chord.

The change in the chord angle is rooted in the weakening curvature of the streamlines 16, thereby yielding the largest or best possible suitable lift force component $A_x$ in flight direction 18 in the respective profile section in terms of balancing the lift force component $A_x$ against an additional induced drag. These force percentages may be added over the entire height of the rudder units 34, resulting in an overall thrust force that acts to reduce the drag for the entire configuration of the aircraft. This provides the highest possible aerodynamic quality for the configuration with the corresponding performance advantages.

Figure 6:
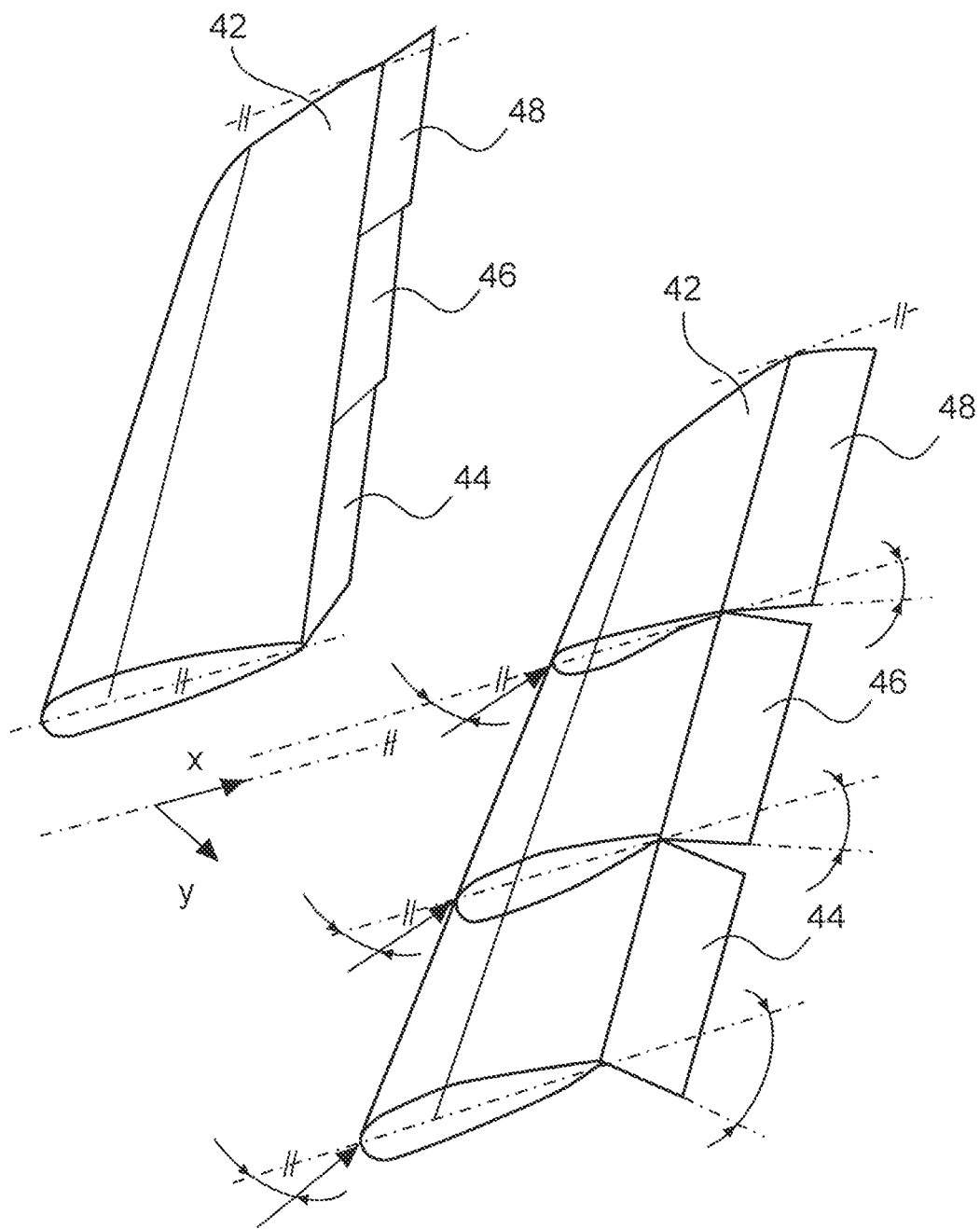
FIG. 6 shows two rudder units of an aircraft according to an embodiment of the invention with segmented rudders.

The correlation shown on FIG. 5 may also be achieved by continuously changing the curvature using rudders of the kind shown on FIG. 6. Two rudder units 42 are shown here, and each equipped with three rudder segments 44, 46 and 48. As the distance from the aircraft surface increases, the selected rudder angle to the respective chord decreases. This also makes it especially easy to retrofit already existing aircraft that have a rudder segmentation.

In like manner, it would be relatively simple to manufacture the rudder unit 42, since no twisted shape needs to be formed, and the deflection of individual rudder segments 44 to 48 may be very readily adjusted using the software of a flight control unit.

Let it expressly be noted at this juncture that all features depicted on FIGS. 2a to 6 may also be combined with each other. For example, a rudder could have a non-symmetrical profile, and simultaneously bring about a further improvement in drag reduction via the corresponding actuation of a rudder. At the same time, a rudder unit twisted by height could exhibit individual curved profile sections, along with a segmented rudder, which additionally enables a varying deflection of rudder segments by height.

In addition, let it be noted that "comprising" does not preclude any other elements or steps, and that "a" or "an" do not rule out a plurality. Let it further be noted that features described with reference to one of the above exemplary embodiments may also be used in combination with other features from other exemplary embodiments described above. The reference numbers in the claims are not be construed as a limitation. Moreover, while at least one exemplary embodiment has been presented in the foregoing summary and detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft having a longitudinal axis, comprising:
   a first rudder unit having a profile and fixedly secured to the aircraft; and
   a second rudder unit in a non-central arrangement with the first rudder unit and having the profile and fixedly secured to the aircraft,
   wherein the profile of the first rudder unit and the second rudder unit at least regionally has a positive geometric angle of incidence relative to an inflow directed toward the first rudder unit and the second rudder unit, and the profile generates a lift force having a component pointing in a flight direction along the longitudinal axis of the aircraft.

2. The aircraft of claim 1, wherein the profile is symmetrical.

3. The aircraft of claim 1, wherein the profile is not symmetrical and has a curvature.

4. The aircraft of claim 1, wherein the profile at least regionally has local chords that include an outwardly directed and a positive angle differing from zero relative to the longitudinal axis of the aircraft.

5. The aircraft of claim 1, wherein the profile has local chords that include an outwardly directed and a positive angle relative to the longitudinal axis of the aircraft that decreases as a rudder unit height increases.

6. The aircraft of claim 1, wherein the profile has a curvature and the curvature decreases as a rudder unit height increases.

7. The aircraft of claim 1, wherein the first rudder unit has a rudder with at least one rudder segment and the at least one rudder segment is deflected during a straight flight so as to increase a curvature and generate the lift force with the component in the flight direction.

8. The aircraft of claim 1, wherein the second rudder unit has a rudder with at least one rudder segment and the at least one rudder segment is deflected during a straight flight so as to increase a curvature and generate the lift force with the component in the flight direction.

9. The aircraft of claim 7, wherein the first rudder unit has greater than two rudder segments lying one above the other that are deflected to less of an extent relative to the first rudder unit as a rudder unit height increases.

10. The aircraft of claim 8, wherein the second rudder unit has greater than two rudder segments lying one above the other that are deflected to less of an extent relative to the first rudder unit as a rudder unit height increases.

11. The aircraft of claim 1, having at least two distanced rudder units spaced apart and arranged in mirror symmetry around the longitudinal axis of the aircraft.

12. A method of operating an aircraft having a longitudinal axis, comprising:
    providing at least two rudder units in a non-central arrangement, the at least two rudder units having a profile and fixedly secured to the aircraft;
    adjusting the profile to yield an inflow at a positive geometric angle of incidence; and
    generating a lift force with the profile having a component pointing in a flight direction along the longitudinal axis of the aircraft in order to offset a portion of a drag of the aircraft.

13. The method of claim 12, further comprising the step of directing local chords of the profile in an outward direction and at a positive angle differing from zero relative to the longitudinal axis of the aircraft.

14. The method of claim 12, further comprising the step of directing local cords of the profile in an outward directed and at a positive angle relative to the longitudinal axis of the aircraft that decreases as a rudder unit height increases.

15. The method of claim 12, further comprising the step of deflecting a rudder segment of at least one of the at least two rudder units during a straight flight so as to increase a curvature and generate the lift force with the component in the flight direction.

16. The method of claim 12, further comprising the step of deflecting at least two rudder segments of the at least two rudder units lie one above the other and deflect to a lesser extent as a rudder unit height increases.

* * * * *